Aug. 20, 1968     C. O. SCHRADER     3,397,937

STOP-FRAME MECHANISM FOR A MOTION PICTURE PROJECTOR

Filed June 7, 1965     3 Sheets-Sheet 1

CLARENCE O. SCHRADER
INVENTOR.

BY
ATTORNEYS

Aug. 20, 1968   C. O. SCHRADER   3,397,937
STOP-FRAME MECHANISM FOR A MOTION PICTURE PROJECTOR
Filed June 7, 1965   3 Sheets-Sheet 2
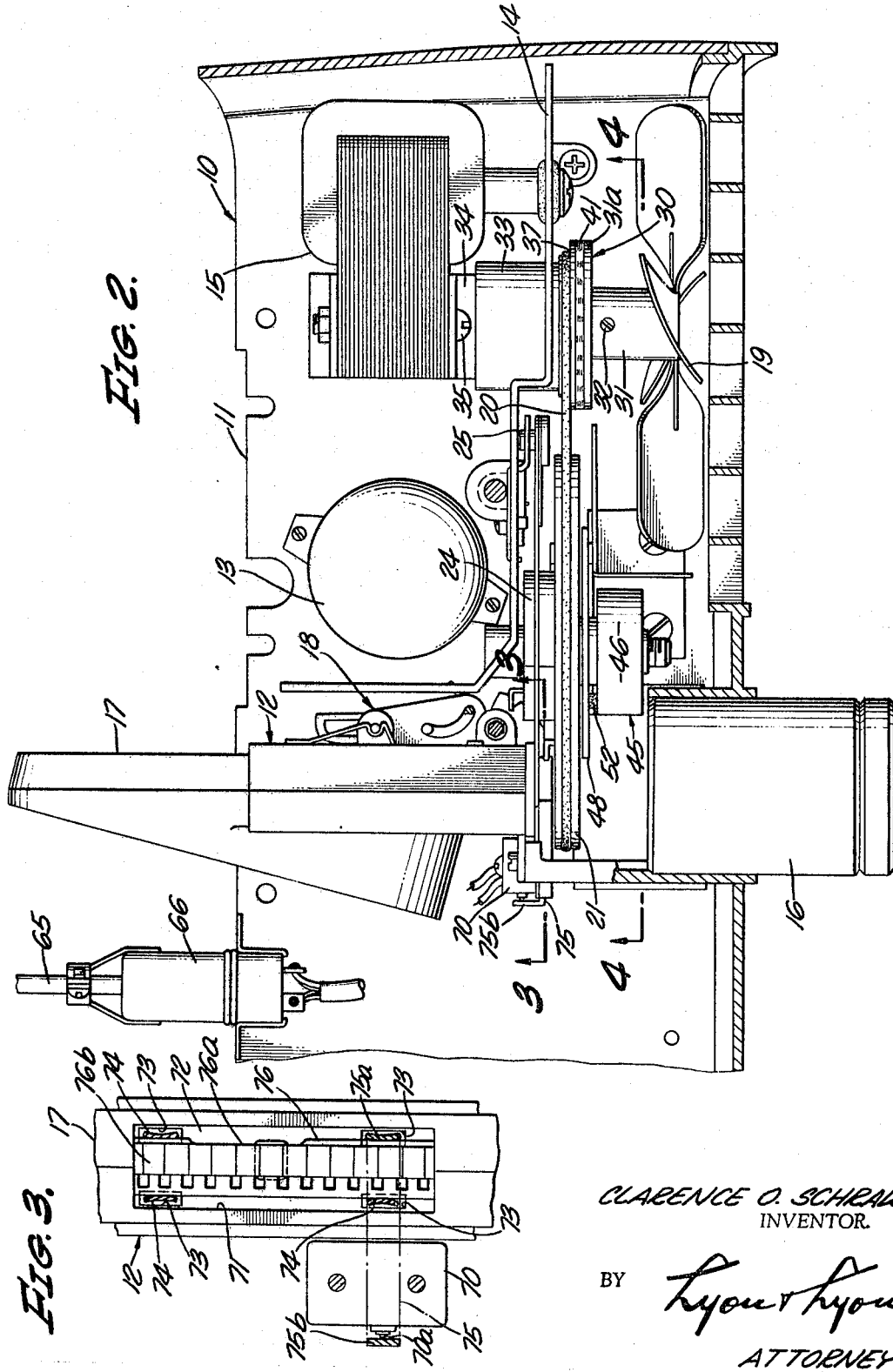
CLARENCE O. SCHRADER
INVENTOR.
BY Lyon & Lyon
ATTORNEYS Aug. 20, 1968  C. O. SCHRADER  3,397,937
STOP-FRAME MECHANISM FOR A MOTION PICTURE PROJECTOR
Filed June 7, 1965  3 Sheets-Sheet 3
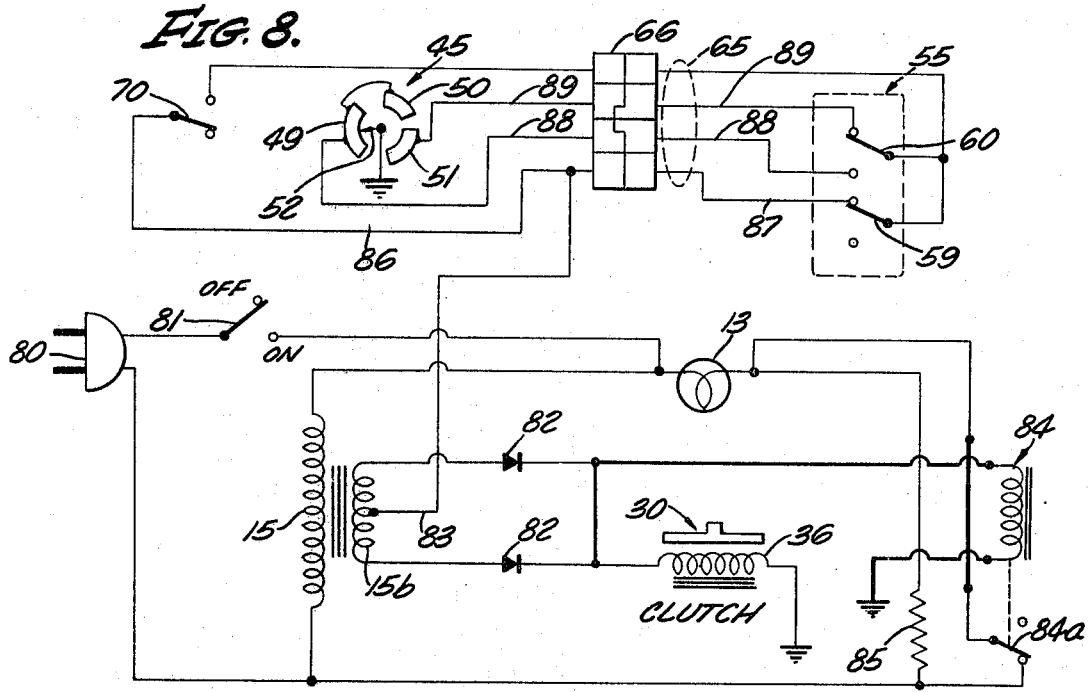
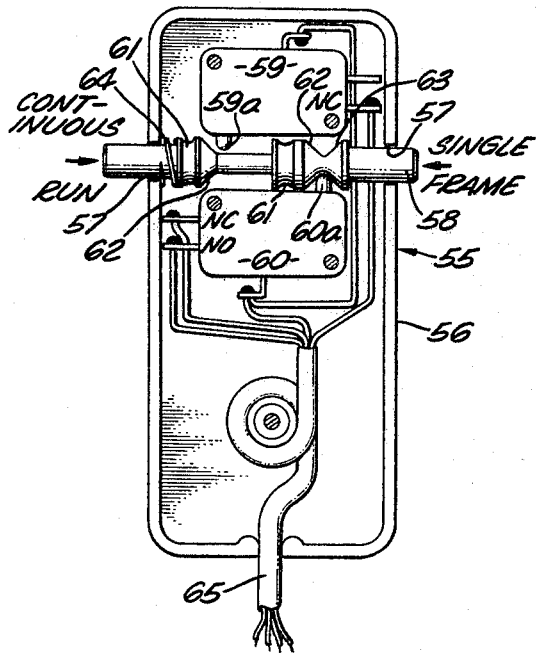
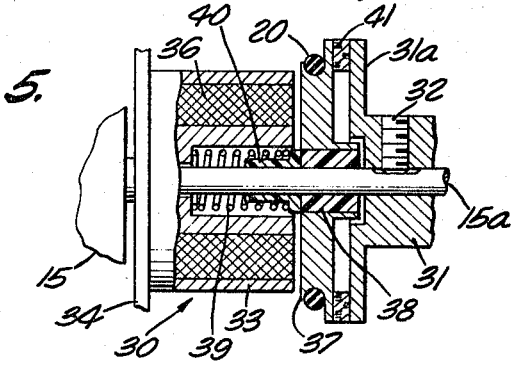
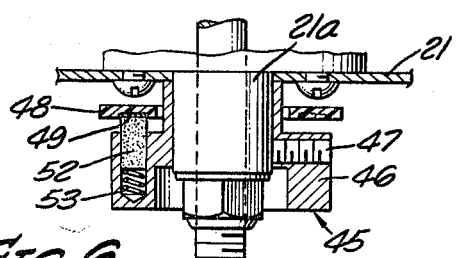
CLARENCE O. SCHRADER
INVENTOR.
BY Lyon & Lyon
ATTORNEYS United States Patent Office
3,397,937
Patented Aug. 20, 1968

3,397,937
STOP-FRAME MECHANISM FOR A MOTION PICTURE PROJECTOR
Clarence O. Schrader, Los Angeles, Calif., assignor to Technicolor Inc., a corporation of Delaware
Filed June 7, 1965, Ser. No. 461,894
15 Claims. (Cl. 352—169)

ABSTRACT OF THE DISCLOSURE

A motion picture projector having apparatus for selective stop-frame and single frame advance operation including a clutch-brake device through which the film advance and shutter is driven and a rotary switch coupled to the shutter for causing the brake to be applied to stop the shutter only in an open position, and switches for activating the clutch-brake device both manually and in response to a cue on the motion picture film.

---

This invention relates to a motion picture projector and, in particular, is directed to a stop-frame mechanism whereby one or more individual frames of a motion picture film may be automatically or selectively stopped and projected for an extended period of time.

There are many well-known reasons for wishing to stop the continued projection of a motion picture film at a particular frame of the film for extended projection of that frame. For example, a small group of persons viewing a motion picture film may wish to examine a partcular scene in detail. Further, educational films may have written material or the like which requires a period of time to consider. Normally, with 8 mm. film 40 to 100 frames of film are required to allow sufficient time to read a projected page of written text. Whereas, if the film can be stopped at a frame of written text, then the quantity of film used is greatly reduced. This permits the compilation of an educational film or the like of a lengthy exhibit time which employs a minimum amount of film. For example, a standard 8 mm. film reel accommodates 50 feet of film with a normal running time of only 4 minutes, whereas an informative film has been compiled using intermixed motion scenes and stop-motion written text on 50 foot of 8 mm. film which has an exhibition time of 45 minutes. In other words, a single roll of film served the purpose which would normally have required 11 or 12 separate rolls of film projected continuously.

While the general concept of stopping a motion picture film for extended projection of a single frame has been accomplished previously, the necessary apparatus has been extremely complex. In particular, combining automatic stop-motion and manual selective stop-motion for greatest versatility has compounded the complexity.

Accordingly, it is a principal object of this invention to provide a novel form of mechanism for incorporation in any style of motion picture projector wherein the film may be stopped for single frame projection either automatically by virtue of cueing means on the film or manually by the operator.

Another object of this invention is to provide a novel form of stop-frame mechanism wherein electrical switching means serve to operate an electro-magnetic clutch and brake for stopping the film and the film shutter in the open position without necessarily stopping the drive motor.

A further object of this invention is to provide a novel form of electrical switching means which is synchronized with the shutter and film advance mechanism of the projector for assuring that actuation of the stop-motion mechanism results in the projection of a single frame of film through an open shutter.

Still another object of this invention is to provide an electrically operated stop-frame mechanism for a motion picture projector wherein two distinct manipulations of the switching means are required to advance the stopped film whereby a single frame advancement can be successively achieved thereby minimizing the number of film frames needed for written text or other such material.

Another object of this invention is to provide cueing means on the film for actuating the stop motion mechanism and wherein movement of the film is resumed by manipulation of a switching means by the operator.

Other and more detailed objects and advantages of this invention will appear from the following description and the accompanying drawings, wherein:

FIGURE 2 is a sectional plan view of the projector taken substantially on the line 2—2 in FIGURE 1.

FIGURE 3 is a fragmentary sectional elevation view of the film gate portion of the projector taken substantially on the line 3—3 in FIGURE 2 and illustrating the switching and film cueing means for automatic stop frame operation.

FIGURE 5 is a fragmentary sectional view taken substantially on the line 5—5 in FIGURE 4 and illustrating the clutch-brake mechanism.

FIGURE 6 is a fragmentary sectional plan view taken substantially on the line 6—6 in FIGURE 4 and illustrating the rotary switching mechanism.

FIGURE 7 is an elevation view of the inside of the hand control switch.

FIGURE 8 is the electrical circuit diagram for the mechanism of this invention.

Figure 1:
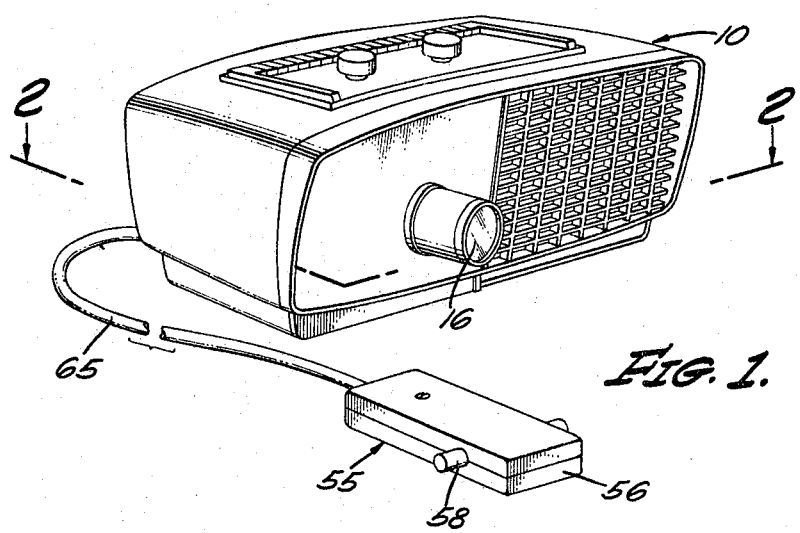
FIGURE 1 is a perspective view of a motion picture projector which includes the stop frame mechanism of this invention operable by the illustrated hand control.

For convenience, the motion picture projector, generally designated 10, illustrated in the drawings is of the type disclosed in my U.S. Letters Patent No. 3,139,789, Cartridge Motion Picture Projector, but it will readily be appreciated by those skilled in the art that this invention is equally applicable and adaptable to any other form of motion picture projector by appropriately adapting the elements to the corresponding components of such other projector. Since the basic operation and construction of projector 10 is described in my afore-mentioned patent, it will not be repeated here except insofar as is necessary to an understanding of this invention.

Figure 4:
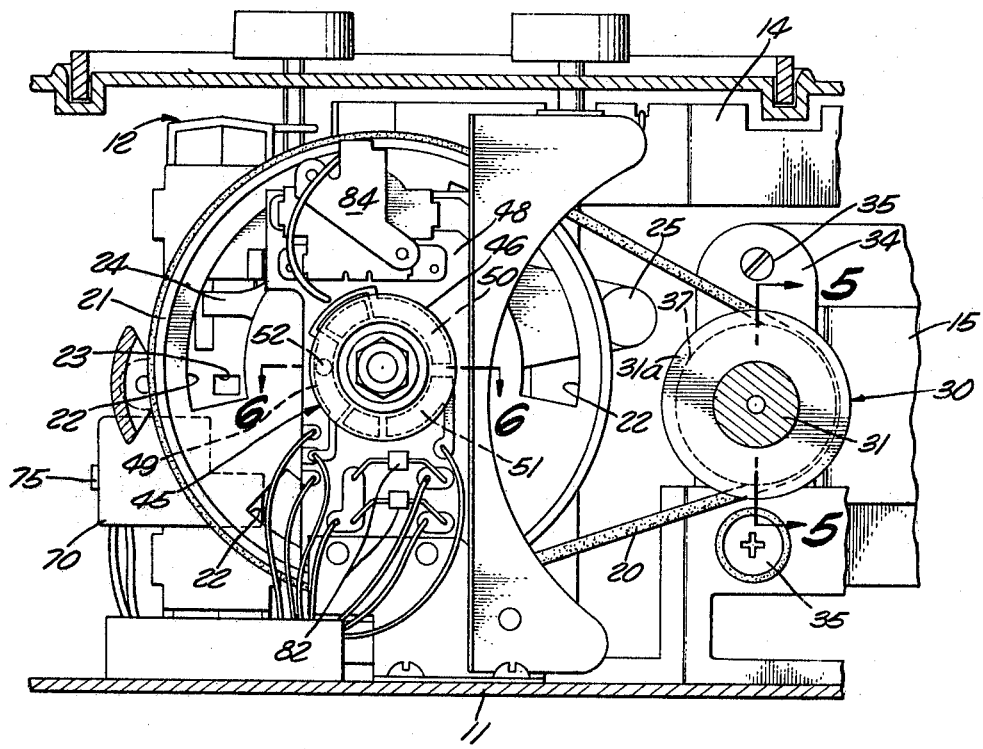
FIGURE 4 is a fragmentary sectional elevation view taken substantially on the line 4—4 in FIGURE 2 and illustrating the physical arrangement of the switching means of the stop-frame mechanism.

Referring now to FIGURES 2 and 4, the projector 10 includes a frame 11 on which is mounted a cartridge socket assembly 12, a light bulb 13, a partition wall 14, a motor 15 and a projection lens 16. The film cartridge 17 removably fits in the socket assembly 12 and a light reflecting assembly 18 is adapted to reflect the light from bulb 13 through the film and out the projection lens 16. The shaft of motor 15 extends forward through partition wall 14 for continuously driving a fan 19 which serves to cool the motor and light bulb and for normally driving a belt 20. The actual means for supporting and driving fan 19 and belt 20 will be described hereinafter in greater detail but such is not necessary for the present understanding of the normal continuous operation of the projector. Belt 20 engages the periphery of and serves to rotate the circular shutter 21 which has three circumferential apertures 22. The three spaced apertures 22 serve to interrupt the image projected from the projection aperture 23 three times during each revolution of the shutter 21 to minimize the perceptibility of the "flicker" in advancing the film a single frame for each revolution of shutter 21. The film advance mechanism comprises a claw arm 24 pivotally mounted at 25 and driven by a cam mounted on the same shaft as shutter 21, whereby the film is advanced a single frame per revolution of shutter 21 and such advancement is accomplished between two of the apertures 22 so that the film advance is not projected onto the screen. As thus far described, the projector 10 and the components are essentially the same and serve the identical functions as described in my afore-mentioned U.S. Letters Patent No. 3,139,789.

Means are provided for interrupting the drive from motor 15 to the shutter 21 and film advance mechanism and, as shown in the drawings, these means may include an electro-magnetic clutch-brake, generally designated 30. Referring particularly to FIGURE 5, the shaft 15a of the motor 15 extends through the clutch-brake 30 and a hub 31 of the clutch-brake is fixedly mounted on the outer end of the shaft by a set screw 32. Fan 19 is attached to hub 31 for causing rotation of the fan whenever the motor 15 is operating. The clutch-brake 30 includes a housing 33 mounted on a support strap 34 which is in turn mounted on the motor 15 by screws 35. An electrical coil 36 is mounted in housing 33 concentric with the shaft 15a and forms an electromagnet. A steel pulley 37 has a peripheral groove for accommodating the belt 20 and is mounted on a bushing 38. Bushing 38 is slidably mounted on motor shaft 15a and is preferably of an appropriate self-lubricating bearing material. A coil compression spring 39 is mounted in housing 33 and engages a slidable collar 40 which in turn engages the bushing 38 for biasing the pulley 37 in a direction away from the housing 33 and toward the flange portion 31a of the hub 31. An annular friction ring 41 of any convenient material such as cork or other clutch plate materials is secured to the pulley 37. The spring 39 urges the pulley 37 and the friction ring 41 into engagement with the flange portion 31a whereby the normal continuous operation of the projector 10 as described above is achieved by the motor 15 driving the belt 20 through the shaft 15a, hub 31, flange 31a, friction ring 41 and pulley 37.

However upon energizing the electro-magnetic coil 36, the steel pulley 37 is magnetically pulled away from the flange portion 31a and into engagement with the housing 33 to abruptly stop the rotation of pulley 37. The electromagnetic force developed by energizing coil 36 is obviously in excess of the spring biasing force of coil spring 39. It will be recognized that stopping the rotation of pulley 37 will arrest both the rotation of shutter 21 and the film advance movement of claw arm 24 thereby leaving a single frame of film to be projected through one of the shutter apertures 22. It will further be recognized that the motor 15 need not be stopped and that the continued rotation of shaft 15a and hub 31 causes rotation of the fan 19 to continually cool the entire projector. However, it will readily appear to those skilled in the art that a separate cooling fan and motor might be provided in a particular projector where convenient and be completely dissociated from clutch-brake mechanism 30.

In order to assure that actuation of clutch-brake 30 causes the shutter 21 to stop in a position with an aperture 22 directly opposite the projection aperture 23 rather than the shutter covering such projection aperture, means are provided for synchronizing the energizing of the electro-magnetic coil 36 with the position of shutter 21 and, as shown in the drawings, these means may include the rotary switch, generally designated 45. The electrical interconnection between coil 36 and rotary switch 45 will be described hereinafter in greater detail relative to the electrical diagram of FIGURE 8. Physically, rotary switch 45 includes a collar 46 mounted on the hub 21a of the circular shutter 21 and fixed in the appropriate position by a set screw 47 as shown in FIGURE 6. An insulated circuit board 48 is mounted on the frame 11 of the projector and encircles the hub 21a between the collar 46 and shutter 21. Three circumferentially extending conductor segments or contact strips 49, 50 and 51 are provided on the circuit board 48 concentrically with the shutter 21 and facing the collar 46. An electrical brush or contact point 52 is movably mounted in collar 46 at an eccentric location and is biased toward the circuit board 48 by any convenient means, such as spring 53. The contact point 52 is adapted to successively engage the contact strips 49, 50 and 51 as the shutter 21 is rotated. The contact segments or strips 49, 50 and 51 are of an angular extent roughly corresponding to the angular extent of the apertures 22 in the shutter 21 and similarly spaced. The collar 46 is mounted on hub 21a of the shutter 21 with the contact point 52 oriented relative to the apertures 22 so that the contact point 52 will only engage one of the contact strips 49, 50 or 51 while one of the shutter apertures 22 is directly opposite the exposure aperture 23. As will hereinafter be seen from the description of the electrical circuit, the coil 36 of the clutch-brake 30 can only be energized if the contact point 52 is engaging one of the contact segments 49, 50 or 51 and thus synchronization between the stop position of the shutter and the film projection aperture 23 is obtained. Of course, since the film advance mechanism including claw arm 24 operates only during a "closed" portion of the rotation of shutter 21 (that is, when an aperture 22 is not directly opposite projection aperture 23) it is assured that the film will be in a full-frame position rather than between frames.

Referring now to FIGURE 7, a hand control switch, generally designated 55, is shown and comprises the preferred arrangement. The switch includes a longitudinally split housing 56 having laterally aligned and spaced holes 57 for slidably receiving a control bar 58. A pair of switches 59 and 60 are mounted in housing 56 on either side of the control bar 58 and have their actuating buttons 59a and 60a, respectively, facing and biased toward the control bar 58. Switch 59 is closed with the button 59a in the extended position and open when the button is depressed. Switch 60 is a two position switch. The control bar 58 includes a pair of annular grooves 61 of a sufficient diameter and longitudinally spaced an appropriate distance for simultaneously engaging the switch buttons 59a and 60a to depress those buttons when the control bar 58 is moved to the right hand most position as viewed in FIGURE 7. Conical surfaces 62 are provided on control bar 58 immediately adjacent the grooves 61 for smoothly depressing the switch buttons 59a and 60a as the control bar is moved to the right. Another conical surface 63 is provided on control bar 58 and faces the opposite direction adjacent switch button 60a whereby movement of the control bar to the left from the position shown in FIGURE 7 will depress switch button 60a but it is to be noted that this will not cause movement of switch button 59a. As will appear more fully in the description of the electrical diagram of FIGURE 8 of the three possible positions of hand switch 55, the position of control bar 58 illustrated in FIGURE 7 will cause actuation of the clutch-brake 30 to stop the film movement, movement of the control bar 58 to the left accomplishes successive single frame advancement, and movement of control bar 58 to the right will cause normal continuous operation of the projector. The small spring 64 may be provided for urging the control bar 58 toward the right but the biasing force thereof is insufficient to independently cause depression of the switch buttons 59a and 60a by moving the control bar. An extension line 65 of any desired length connects the hand switch 55 to the projector 10 through an appropriate detachable plug 66.

Means are provided for automatically stopping the film movement for projection of a single frame in response to cueing means on the film itself and, as shown in the drawings, these means may include a normally closed switch 70 mounted adjacent the socket assembly 12 of the projector. Referring particularly to FIGURE 3, the film cartridge 17 which fits into the socket 12 has a large opening 71 in the front and a spring biased aperture plate 72 which in turn has four openings 73 therein for normally receiving four film guiding means 74 mounted on the socket assembly 12 for accurately guiding the film passed the projection aperture 23, all as described in greater detail in my aforementioned Patent No. 3,139,789. However in the preferred arrangement of this invention, one of the film guiding means is replaced with a laterally movable slide bar 75 having a right angle portion 75a for engaging the unperforated edge of the film and another right angle portion 75b for engaging the switch button 70a of switch 70. By this arrangement the film normally holds the switch button 70a in the depressed position thereby holding the switch "open" and the spring biased switch button 70a urges the slide bar 75 toward the left as viewed in FIGURE 3. The film 76 may have one or more notched out portions 76a along one edge of the film to serve as the cueing means for cooperating with the portion 75a of the slide bar to actuate switch 70 and cause the film to stop for extended projection of a particular frame 76b of the film. By notching the film at 76a the slide bar 75 may move to the left to release the switch button 70a. By making the notched out portion 76a of any appropriate length along the film edge, the switch 70 may be retained in the closed position for successive prolonged projection of individual film frames which have different subject matter thereon. While one combination of means have been shown and described for causing film cueing means to actuate the stop frame mechanism of this invention, it will readily appear to those skilled in the art that various other cooperating cueing means and sensing means could be employed for achieving this automatic opening and closing of a switch.

Referring now to the electrical circuit shown in FIGURE 8, the power supply 80 to the projector is controlled by the usual on-off switch 81 and serves to operate the afore-described motor 15 and light bulb 13. The secondary winding 15b of the motor 15 is connected at either end to a pair of rectifiers 82 forming a supply of direct current to the electro-magnetic coil 36 of the clutch-brake 30 when the circuit is completed by grounding the center tap line 83 from the secondary motor winding 15b. This concurrently serves as a direct current supply to the coil of a relay 84 operating a switch 84a. Under normal operating condition of the projector, the switch 84a is in the closed position shown whereby full line voltage is applied across the light bulb 13 but upon actuation of the stop frame mechanism of this invention, the switch 84a is moved to the open position by the relay to interpose the resistor 85 in series with the light bulb 13. This serves to dim the light bulb an appropriate amount for producing a light intensity for stop frame projection of a brightness comparable to normal moving projection and to reduce the heat produced by the light bulb which might otherwise be damaging to the single film frame that is being projected. The center tap line 83 is connected through wire 86 to switch 70 and through wire 87 to switch 59, whereby one or the other of these switches 59 and 70 must be in the closed position for establishing electrical connection to the balance of the circuit. As previously described, the closed position of either switch 59 or switch 70 is the appropriate position for the stop-frame actuation of the clutch-brake 30. The other side of switches 59 and 70 are both connected to the switch 60. Switch 60 has its two poles connected through lines 88 and 89 to the contact strip segments 49 and 51, respectively, of the rotary switch 45. The remaining segment 50 is connected to segment 49. The rotating contact point 52 of the rotary switch 45 is electrically grounded as are one side of both the electro-magnetic coil 36 and the relay coil 84, whereby the complete direct current circuit is established.

As illustrated in FIGURE 8, the main line off-on switch 81 is in the off position but if same is moved to the on position the projector will begin operating which in turn will cause rotation of the contact point 52 of switch 45 by reason of the rotation of the shutter. While switch 59 is in a position to complete a circuit to switch 60 for stop-frame projection, switch 60 is in the position electrically connected through line 89 to the contact segment 51. Therefore rotary switch 45 is affectively "open" until contact point 52 reaches segment 51, whereupon the rotary switch is "closed" thereby completing the circuit to ground. This energizes the clutch-brake 30 to arrest the rotation of the shutter for stop-frame projection. If it is desired to resume continuous film projection, the hand switch 56 is operated to move control bar 58 to the right thereby depressing switch buutons 59a and 60a to move the switches to their other position, which includes opening switch 59 to disconnect the circuit. If single frame advancement of the film is desired, then control bar 58 is moved to the left to change only the position of switch 60 from connection with line 89 to connection with line 88 whereby the electrical ground through segment 51 and contact 52 is interrupted causing momentary release of the clutch-brake 30 until the contact point 52 rotates to a position engaging contact segment 49 or 50 (depending on the direction of rotation) whereby the electrical ground is again completed to actuate the clutch-brake. Release of the control bar 58 then permits the control bar to return to the position shown in FIGURE 7, whereby the electrical circuit is again broken to permit rotation of the shutter and contact point 52 back to a position engaging the contact segment 51. Since a complete revolution of the shutter 21 has been accomplished, the film has been advanced a single frame.

While the control bar 58 of the hand switch 55 is in the position for continuous running of the film with switch 59 open, if a notched portion 76a of the film 76 encounters the slide bars 75 to thereby release the switch 70, the switch will be closed. Closing of switch 70 completes the circuit from center tap line 83 through line 86 and switch 70 to switch 60. At such time switch 60 would be in the position electrically closed through line 88 to segments 49 and 50 of the rotary switch 45. Thus as soon as the rotating contact 52 engages either segment 49 or segment 50, the electrical ground will be completed thereby actuating the clutch-brake 30 and the relay 84. To either resume continuous projection or cause single frame advancement, the hand switch 55 is manipulated to successively change the position of switch 60 and successively cause partial revolutions of the shutter until the film notch 76a passes the slide bar 75 thereby opening switch 70 to resume normal operation.

Thus it may be seen that a simple and yet effective stop-frame mechanism is provided which is easily incorporated in the components of a conventional projector. While such incorporation is described herein with respect to a particular style of projector, it will readily appear to those skilled in the art that my stop-farme mechanism may be adapted to other conventional projectors. Having fully described my invention, it is to be understood that I do not wish to be limited to the details herein set forth or to the details illustrated in the drawings but my invention is of the full scope of the appended claims.

I claim:

1. In a motion picture projector adapted for stop-frame operation, the combination of; shutter means for intermittently interrupting the projected image, film advance means, a motor for operating said shutter and said film advance means, electromagnetic clutch-brake means for stopping the operation of the film advance and the shutter and simultaneously disengaging the motor from the shutter and film advance, a rotary switch with a rotary contact coupled to and synchronized with said shutter and film advance means, a plurality of stationary contact means in said rotary switch, first manual switching means for actuating said clutch-brake means in one position of said manual switch and at one position of said rotary contact with regard to said stationary contacts, means for actuating said clutch-brake means in a second position of said manual switch and at a second position of said rotary contact with regard to a second stationary contact in said rotary switch, and a second manual switching means having two positions and with only one of said positions for actuating said clutch-brake means through said first manual switch.

2. In a motion picture projector adapted for stop-frame operation with film having cueing means, the combination of; shutter means for intermittently interrupting the projected image, film advance means, a motor for operating said shutter and said film advance means, electromagnetic clutch-brake means for stopping the operation of the film advance and the shutter and simultaneously disengaging the motor from the shutter and film advance, a rotary switch coupled to the shutter with a rotary contact synchronized with said shutter and film advance means, a plurality of stationary contact means in said rotary switch, first manual switching means for actuating said clutch-brake means in one position of said manual switch and at one position of said rotary contact with regard to said stationary contacts, means for actuating said clutch-brake means in second position of said manual switch and at a second position of said rotary contact with regard to a second stationary contact in said rotary switch, a second manual switching means having two positions and with only one of said positions for actuating said clutch-brake means through said first manual switch, and an automatic switch having means responsive to the film cueing means and having two positions with only one position for actuating said clutch-brake means through said first manual switch.

3. In a motion picture projector adapted for stop-frame operation with film having cueing means the combination of: shutter means for intermittently interrupting the projected image, film advance means, a motor for operating said shutter and said film advance means, electromagnetic braking means for stopping the operation of the film advance and the shutter, a rotary switch coupled to the shutter with a rotary contact synchronized with said shutter and film advance means, a pair of stationary contact means, first manual switching means connecting one of said stationary contacts to said braking means in one position and connecting the second stationary contact to the braking means in a second position, a second switch between the first switch and the parking means, said second switch being normally open for continuous operation of the projector and being manually closed for stop-motion projection, a third switch in parallel with said second switch, said third switch normally being open and being closed in response to cueing means on the film being projected, and a source of electrical current to said braking means, said current having connecting means to said rotary contact.

4. In a motion picture projector which is adapted for selective and automatic stop-frame operation and has a shutter and film advance mechanism for projecting film having predetermined cueing means therealong, the improvement comprising, means for stopping the shutter and film advance mechanism, a selectively operable manual switch and an automatic switch responsive to the cueing means on the film operably connected in parallel for separately initiating actuation of said means, and a third switch operably connected in series with the other two switches and physically coupled to and synchronized with the shutter for completing the circuit for causing actuation of said stopping means in predetermined positions of said third switch corresponding to the open positions of the shutter.

5. In a motion picture projector which is adapted for selective and automatic stop-frame operation and has a shutter and film advance mechanism for projecting film having predetermined cueing means therealong, the improvement comprising, means for stopping the shutter and film advance mechanism with the shutter open and without interrupting the optical projection of the film, a selectively operable manual switch, an automatic switch responsive to the cueing means on the film, said switches operably connected in parallel for separately initiating actuation of said means, and a third switch operably connected in series with the other two switches for completing the circuit for causing actuation of said means in predetermined positions of said third switch, said third switch coupled to the shutter and including means responsively coordinating the open positions of the shutter with said predetermined positions of the third switch.

6. In a motion picture projector which is adapted for selective stop-frame operation and has a shutter and film advance mechanism driven by the projector motor, the improvement comprising, clutch-brake means for disconnecting the motor from and stopping the shutter and film advance mechanism, a selectively operable manual switch initiating actuation of said clutch-brake means, and a rotary switch operably connected in series with the manual switch and physically coupled and synchronized with the shutter for completing the circuit for causing actuation of said clutch-brake means in the open positions of the shutter.

7. In a motion picture projector which is adapted for selective stop-frame operation and has a shutter and film advance mechanism, the improvement comprising, brake means for stopping the shutter and film advance mechanism with the shutter open and without interrupting the optical projection of the film, a selectively operable manual switch for initiating actuation of said brake means, and a rotary switch operably connected in series with the manual switch for completing the circuit for causing actuation of said brake means in predetermined closed positions of said rotary switch, said rotary switch coupled to said shutter and having means responsively coordinating said predetermined closed positions with a plurality of open positions of the shutter for each actuation of the film advance mechanism to move the film a single frame.

8. The improvement of claim 7 wherein the motion picture film is provided with predetermined cueing means therealong and an automatic switch is operably connected in parallel to said manual switch and responsive to said cueing means for separately initiating actuation of said brake means.

9. In a motion picture projector which is adapted for selective stop-frame operation and has a circular shutter with plural apertures and film advance mechanism for advancing the film one frame per shutter revolution, the improvement comprising, an electromagnetic clutch-brake means for stopping rotation of the shutter and operation of the film advance mechanism with the shutter open and without interrupting the optical projection of the film, a selectively operable manual switch for initiating actuation of said clutch-brake means, and a rotary switch mounted on said shutter and operably connected in series with the other switch for completing the circuit for causing actuation of said clutch-brake means in predetermined positions of said rotary switch, said rotary switch having a contact point and plural contact segments moving relative to each other during rotation of the shutter for the contact point to successively engage said contact segments, said contact point and contact segments oriented for coordinating the open positions of the shutter with said predetermined positions of the rotary switch.

10. The improvement of claim 9 wherein the said plural contact segments correspond exactly in number and substantially in angular extent to the plural shutter apertures.

11. In a motion picture projector which is adapted for selective and automatic stop-frame operation to project a single film frame, and which has a rotary shutter and film advance mechanism driven by a motor, the improvement comprising, an electrical clutch-brake means selectively operable for disconnecting said motor and arresting the movement of said shutter and film advance mechanism, a rotary switch mounted on said rotary shutter, said rotary switch including a plurality of separate conductive contact strips arranged in a circle and an eccentrically located contact point for riding around in successive engagement with said contact strips during rotation of said shutter, a first selectively operable switch having two positions and electrically connected for selectively completing a circuit to one of two circumferentially spaced said contact strips, and a second selectively operable switch electrically connected to said clutch-brake means and said rotary switch and said first switch for selectively operating said clutch-brake means to cause said motor disconnect and shutter and film advance mechanism arrest upon said contact point engaging the said contact strip connected to said first switch, said first switch manually movable to the other of the two positions thereof with said second switch so operated for causing momentary operation of said clutch-brake means to rotate said shutter a partial revolution until said contact point engages the other of the said two circumferentially spaced contact strips to again cause said motor disconnect and shutter and film advance mechanism arrest.

12. In a motion picture projector which is adapted for selective stop-frame operation to project a single film frame, the combination of: a film advance mechanism coordinated with said shutter for advancing the film during closed positions of said shutter, a motor and drive means for operating said shutter and film advance mechanism, an electrical clutch-brake means interposed in said drive measn selectively operable for disconnecting said motor and arresting the movement of said shutter and film advance mechanism, a rotary switch mounted on the projector and having means synchronizing the position of the rotary switch with the position of the shutter, said rotary switch including a plurality of separate conductive contact strips arranged in a circle and an eccentrically located contact point for riding around in successive engagement with said contact strips during continuing movement of said shutter, a first selectively operable switch having plural positions and electrically connected for selectively completing a circuit to the plurality of circumferentially spaced said contact strips, and a second selectively operable switch electrically connected to said rotary switch and said first switch for selectively completing a circuit and operating said clutch-brake means to cause said motor disconnect and shutter and film advance mechanism arrest upon contact point engaging the contact strip connected to said first switch, said first switch manually movable to another of the plural positions thereof with said second switch so operated for causing momentary operation of said clutch-brake means to operate said shutter and film advance mechanism a partial cycle until said contact point engages the other of the said two circumferentially spaced contact strips to again cause said motor disconnect and shutter and film advance mechanism arrest.

13. In a motion picture projector for projecting a film having cueing means at predetermined locations therealong and which is adapted for selective and automatic stop-frame operation to project a single film frame, the combination of: a film advance mechanism coordinated with said shutter for advancing the film during closed positions of said shutter, a motor and drive means for operating said shutter and film advance mechanism, an electrical clutch-brake means interposed in said drive means selectively operable for disconnecting said motor and arresting the movement of said shutter and film advance mechanism, a rotary switch mounted for synchronized movement with said rotary shutter, said rotary switch including a plurality of separate conductive contact strips arranged in a circle and an eccentrically located contact point for riding around in successive engagement with said contact strips during continuing movement of said shutter, a first selectively operable switch having two positions and electrically connected for selectively completing a circuit to either of two circumferentially spaced said contact strips, a second selectively operable switch electrically connected to said clutch-brake means and said rotary switch and said first switch for selectively operating said clutch-brake means to cause said motor disconnect and shutter and film advance mechanism arrest upon said contact point engaging one of the said two circumferentially spaced contact strips connected to said first switch, a third selectively operable switch associated with the film and electrically connected to said clutch-brake means and said rotary switch and said first switch for selective operation by the cueing means on the film to cause said motor disconnect and shutter and film advance mechanism arrest upon said contact point engaging one of the said two circumferentially spaced contact strips connected to said first switch, and said first switch manually movable to the other of the two positions thereof with either of said second or third switches so operated for causing momentary operation of said clutch-brake means to movement with said shutter and film advance mechanism a partial cycle until said contact point engages the other of the said two circumferentially spaced contact strips to again cause said motor disconnect and shutter and film advance mechanism arrest.

14. In a motion picture projector for projecting a film having cueing means at predetermined locations therealong and which is adapted for selective and automatic stop-frame operation to project a single film frame, the combination of: a rotary shutter having plural projection apertures circumferentially spaced, a film advance mechanism coordinated with said shutter for advancing the film a single frame upon each shutter revolution and between projection apertures, a motor and drive means for rotating said shutter and operating said film advance mechanism, an electrical clutch-brake means interposed in said drive means selectively operable for disconnecting said motor and arresting the movement of said shutter and film advance mechanism, a rotary switch mounted on said rotary shutter, said rotary switch including a plurality of separate conductive contact strips arranged in a circle and an eccentrically located contact point for riding around on and in successive engagement with said contact strips during rotation of said shutter, a first selectively operable switch having two positions and electrically connected for selectively completing a circuit to either of two circumferentially spaced said contact strips, a second selectively operable switch electrically connected to said clutch-brake means and said rotary switch and said first switch for selectively operating said clutch-brake means to cause said motor disconnect and shutter and film advance mechanism arrest upon said contact point engaging the one of the said two circumferentially spaced contact strips connected to said first switch, and a third selectively operable switch associated with the film and electrically connected in parallel with said second switch for automatic operation by the cueing means on the film to cause said motor disconnect and shutter and film advance mechanism arrest upon said contact point engaging the one of the said two circumferentially spaced contact strips connected to said first switch, said first switch manually movable to the other of the two positions thereof with either of said second or third switches so operated for causing momentary operation of said clutch-brake means to rotate said shutter a partial revolution until said contact point engages the other of the said two circumferentially spaced contact strips to again cause said motor disconnect and shutter and film advance mechanism arrest.

15. In a motion picture projector for projecting a film having cueing means at predetermined locations therealong and which is adapted for selective and automatic stop-frame operation to project a single film frame, the combination of: a rotary shutter having plural projection apertures circumferentially spaced, a film advance mechanism coordinated with said shutter for advancing the film a single frame upon each shutter revolution and between projection apertures, a light source for projecting the film image through said shutter projection apertures, a motor and drive means for rotating said shutter and operating said film advance mechanism, an electrical clutch-brake means interposed in said drive means selectively operable for disconnecting said motor and arresting the movement of said shutter and film advance mechanism, a rotary switch mounted on said rotary shutter, said rotary switch including a plurality of separate conductive contact strips arranged in a circle and an eccentrically located contact point for riding around on and in successive engagement with said contact strips during rotation of said shutter, a first selectively operable switch having two positions and electrically connected for selectively completing a circuit to either of two circumferentially spaced said contact strips, a second selectively operable switch electrically connected to said clutch-brake means and said rotary switch and said first switch for selectively operating said clutch-brake means to cause said motor disconnect and shutter and film advance mechanism arrest upon said contact point engaging the one of the said two circumferentially spaced contact strips connected to said first switch, a third selectively operable switch associated with the film and electrically connected in parallel with said second switch for automatic operation by the cueing means on the film to cause said motor disconnect and shutter and film advance mechanism arrest upon said contact point engaging the one of the said two circumferentially spaced contact strips connected to said first switch, said first switch manually movable to the other of the two positions thereof with either of said second or third switches so operated for causing momentary operation of said clutch-brake means to rotate said shutter a partial revolution until said contact point engages the other of the said two circumferentially spaced contact strips to again cause said motor disconnect and shutter and film advance mechanism arrest, a resistor electrically connected in series with said light source, and a switch electrically connected in parallel with said resistor and operable to an open position upon said operation of said clutch-brake means to stop the film for reducing the voltage across and thereby dimming said light source for stop-frame projection.

References Cited

UNITED STATES PATENTS 2,567,499  9/1951  Vaughn _____ 352—179 X
3,238,008  3/1966  Krumbein _____ 352—178 X NORTON ANSHER, *Primary Examiner.*

MONROE H. HAYES, *Assistant Examiner.*